United States Patent
Zhou

(10) Patent No.: US 9,356,513 B2
(45) Date of Patent: May 31, 2016

(54) SEQUENCE CIRCUIT

(71) Applicant: ScienBiziP Consulting (Shen Zhen) Co., Ltd., Shenzhen (CN)

(72) Inventor: Hai-Qing Zhou, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 157 days.

(21) Appl. No.: 14/251,668

(22) Filed: Apr. 14, 2014

(65) Prior Publication Data

US 2014/0306685 A1  Oct. 16, 2014

(30) Foreign Application Priority Data

Apr. 15, 2013 (CN) .................. 2013 1 01289230

(51) Int. Cl.
*H02M 3/158* (2006.01)

(52) U.S. Cl.
CPC ............ *H02M 3/158* (2013.01); *H02M 3/1584* (2013.01); *H02M 2003/1586* (2013.01)

(58) Field of Classification Search
CPC .......... H02M 1/36; H02M 2001/0006; H02M 2001/0003; G06F 1/24; G06F 1/28
See application file for complete search history.

(56) References Cited

U.S. PATENT DOCUMENTS

| | | | | |
|---|---|---|---|---|
| 3,522,510 A * | 8/1970 | Cameron | ............ | H02M 3/3155 363/20 |
| 5,126,651 A * | 6/1992 | Gauen | .................. | H02M 3/158 323/222 |
| 5,949,222 A * | 9/1999 | Buono | ................ | H02M 3/1563 323/222 |
| 7,400,188 B2 * | 7/2008 | Huang | ..................... | G11C 5/14 327/143 |
| 7,639,063 B2 * | 12/2009 | Xiong | ..................... | G06F 11/24 327/365 |
| 7,679,224 B2 * | 3/2010 | Ren | .......................... | G06F 1/26 307/130 |
| 8,205,104 B2 * | 6/2012 | Hu | ............................ | G06F 1/26 327/431 |
| 8,255,718 B2 * | 8/2012 | Xi | ............................ | G06F 1/263 455/573 |
| 8,410,842 B1 * | 4/2013 | Bai | .......................... | G06F 1/26 327/427 |
| 9,018,798 B2 * | 4/2015 | Pan | .......................... | G06F 1/28 307/31 |
| 2003/0112568 A1 * | 6/2003 | Holt | .................... | H02M 3/1588 361/91.1 |
| 2009/0300375 A1 * | 12/2009 | Zou | ........................... | G06F 1/26 713/300 |
| 2010/0001589 A1 * | 1/2010 | Shi | ........................... | G06F 1/26 307/115 |
| 2010/0211811 A1 * | 8/2010 | Zhou | ......................... | G06F 1/26 713/330 |
| 2010/0223485 A1 * | 9/2010 | Zou | ........................... | G06F 1/26 713/340 |

(Continued)

*Primary Examiner* — Timothy J Dole
*Assistant Examiner* — Yusef Ahmed
(74) *Attorney, Agent, or Firm* — Novak Druce Connolly Bove + Quigg LLP

(57) ABSTRACT

A sequence circuit includes a power output terminal, first to third power input terminals, first to sixth resistors, first to tenth filed effect transistors (FETs), first to third inductors, a first capacitor, a second capacitor, and first to third drivers. The sequence circuit ensures that different voltages work in a correct sequence.

2 Claims, 1 Drawing Sheet

(56) References Cited

U.S. PATENT DOCUMENTS

| | | | | |
|---|---|---|---|---|
| 2010/0306562 A1* | 12/2010 | Chen | G06F 1/26 | 713/323 |
| 2010/0313049 A1* | 12/2010 | Chen | H03K 17/28 | 713/323 |
| 2010/0325464 A1* | 12/2010 | Hu | G06F 1/26 | 713/330 |
| 2011/0121657 A1* | 5/2011 | Zhou | G06F 1/26 | 307/80 |
| 2011/0169467 A1* | 7/2011 | Pan | H03K 17/22 | 323/282 |
| 2011/0246794 A1* | 10/2011 | Liao | G06F 1/263 | 713/300 |
| 2011/0254522 A1* | 10/2011 | Lin | H02M 3/1588 | 323/282 |
| 2011/0305046 A1* | 12/2011 | Guan | H02M 3/156 | 363/21.02 |
| 2012/0106284 A1* | 5/2012 | Huang | G11C 5/14 | 365/226 |
| 2012/0274292 A1* | 11/2012 | Tong | H02M 1/38 | 323/271 |
| 2012/0306435 A1* | 12/2012 | Tu | H02J 7/0052 | 320/107 |
| 2012/0319668 A1* | 12/2012 | Tu | G06F 1/30 | 323/283 |
| 2012/0326682 A1* | 12/2012 | Luo | H02M 1/34 | 323/272 |
| 2013/0278060 A1* | 10/2013 | Tong | H02J 1/00 | 307/31 |
| 2013/0300212 A1* | 11/2013 | Chen | H03K 17/00 | 307/113 |
| 2014/0025969 A1* | 1/2014 | Pan | G06F 1/3234 | 713/320 |
| 2014/0168925 A1* | 6/2014 | Wu | G06F 1/263 | 361/781 |
| 2014/0253022 A1* | 9/2014 | Zhou | H02J 7/022 | 320/107 |
| 2014/0298055 A1* | 10/2014 | Zhou | G06F 1/3231 | 713/320 |
| 2014/0317426 A1* | 10/2014 | Zhou | G06F 1/32 | 713/320 |
| 2014/0320106 A1* | 10/2014 | Zhou | H02M 1/32 | 323/311 |
| 2014/0321003 A1* | 10/2014 | Zhou | H02H 7/1213 | 361/18 |
| 2015/0015073 A1* | 1/2015 | Wu | H02J 1/10 | 307/64 |
| 2015/0188304 A1* | 7/2015 | Zhou | H02H 3/20 | 307/130 |

* cited by examiner

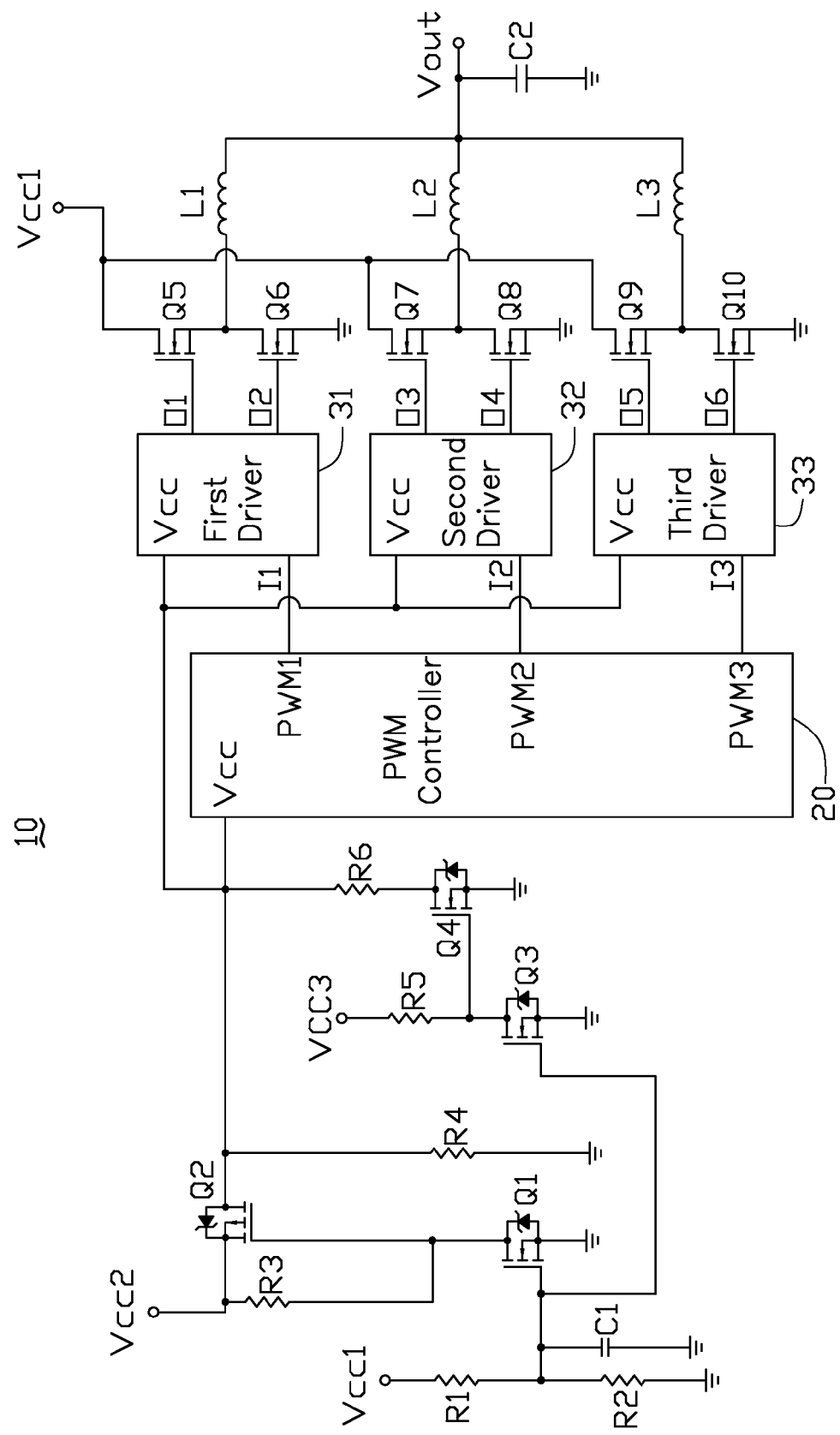

ated. This discussion should not be construed, however, to limit the scope of the disclosure, and all such modifications and similar arrangements are intended to be included within the scope of the following claims.

SEQUENCE CIRCUIT

FIELD

The present disclosure relates to a sequence circuit.

BACKGROUND

In a power circuit for a motherboard, a power voltage must be input earlier than a pulse width management (PWM) voltage and a driver voltage. When the motherboard is rebooted, the power voltage may be input while the PWM voltage and the driver voltage still remain. Thus, the power voltage is input later than the PWM voltage and the driver voltage and the motherboard may be damaged.

Therefore, there is room for improvement in the art.

BRIEF DESCRIPTION OF THE DRAWING

Many aspects of the present disclosure can be better understood with reference to the following drawing. The components in the drawing are not necessarily drawn to scale, the emphasis instead being placed upon clearly illustrating the principles of the present disclosure.

The FIGURE is a circuit diagram of an embodiment of a sequence circuit of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The reference "a plurality of" means "at least two."

The FIGURE shows an embodiment of a sequence circuit 10 of the present disclosure. The sequence circuit 10 may comprise first to third power input terminals Vcc1-Vcc3, resistors R1-R6, filed effect transistors (FETs) Q1-Q10, inductors L1-L3, capacitors C1 and C2, and first to third drivers 31-33.

The first to third power input terminals Vcc1-Vcc3 are used to input power for the sequence circuit 10. In the embodiment, the first to third power input terminals Vcc1-Vcc3 are connected to a power supply. The first power input terminal Vcc1 is grounded through resistors R1 and R2 in that order. The capacitor C1 and the resistor R2 is connected in parallel. A node between the resistors R1 and R2 is connected to a gate of the FET Q1. A source of the FET Q1 is grounded. A drain of the FET Q1 is connected to a gate of the FET Q2. The gate of the FET Q2 is connected to the second power input terminal Vcc2 through the resistor R3. A source of the FET Q2 is connected to the second power input terminal Vcc2. A drain of the FET Q2 is connected to a power pin Vcc of a pulse width management (PWM) controller 20. The drain of the FET Q2 is also grounded through the resistor R4. A gate of the FET Q3 is connected to the gate of the FET Q1. A source of the FET Q3 is grounded. A drain of the FET Q3 is connected to the third power input terminal Vcc3 through the resistor R5. A gate of the FET Q4 is connected to the drain of the FET Q3. A source of the FET Q4 is grounded. A drain of the FET Q4 is connected to the power pin Vcc of the PWM controller 20. A power pin Vcc of the first driver 31, a power pin Vcc of the second driver 32, and a power pin Vcc of the third driver 33 are connected to the power pin Vcc of the PWM controller 20. A first output pin PWM1 of the PWM controller 20 is connected to an input pin I1 of the first driver 31. A second output pin PWM2 of the PWM controller 20 is connected to an input pin I2 of the second driver 32. A third output pin PWM3 of the PWM controller 20 is connected to an input pin I3 of the second driver 33. Drains of the FETs Q5, Q7, and Q9 are connected to the first power input terminal Vcc1. A gate of the FET Q5 is connected to a first output pin O1 of the first driver 31. A source of the FET Q5 is connected to a drain of the FET Q6. The source of the FET Q5 is also grounded through the inductor L1 and the capacitor C2 in that order. A node between the inductor L1 and the capacitor C2 is connected to a power output terminal Vout. A gate of the FET Q6 is connected to a second output pin O2 of the first driver 31. A source of the FET Q6 is grounded. A gate of the FET Q7 is connected to a first output pin O3 of the second driver 32. A source of the FET Q7 is connected to a drain of the FET Q8. The source of the FET Q7 is connected to the power output terminal Vout through the inductor L2. A gate of the FET Q8 is connected to a second output pin of the second driver 32. A source of the FET Q8 is grounded. A gate of the FET Q9 is connected to a first output pin O5 of the third driver 33. A source of the FET Q9 is connected to a drain of the FET Q10. The source of the FET Q9 is connected to the power output terminal Vout through the inductor L3. A gate of the FET Q10 is connected to a second output pin O6 of the third driver 33. A source of the FET Q10 is grounded.

In the embodiment, the FETs Q1, Q3-Q10 are n-channel FETs. The FET Q2 is a p-channel FET.

A voltage 5VSB is input constantly through the third power input terminal Vcc3. When the power supply is not operating, there are no voltages input through the first power input terminal Vcc1 and the second power input terminal Vcc2. The gate of the FET Q4 is at high level and the FET Q4 is turned on. Thus, the power pins Vcc of the PWM controller 20 and the first to third drivers 31-33 are grounded. The PWM controller 20 and the first to third drivers 31-33 cannot operate.

When the power supply starts to operate, a first voltage is input through the first power input terminal Vcc1. The first voltage charges the capacitor C1 and a voltage of the capacitor C1 increases. The FETs Q1 and Q3 are turned on for the first time. The gate of the FET Q2 is at low level. The FET Q2 is turned on. The gate of the FET Q4 is at low level. The FET Q4 is turned off. A second voltage input through the second power input terminal Vcc2 starts to supply power for the PWM controller 20 and the first to third drivers 31-33. The PWM controller 20 and the first to third drivers 31-33 operate. The first to third drivers 31-33 control the FETs Q5-Q10 according to signals from the PWM controller 20 to output voltages through the power output terminal Vout. The first voltage from the first power input terminal Vcc1 is output earlier than the second voltage from the second power input terminal Vcc2.

When the power supply stops operating, the voltage of the capacitor C1 decreases. The FETs Q1 and Q3 are turned off at the second time. The FET Q2 is turned off The FET Q4 is turned on. The source of the FET Q2 is grounded. The power pins Vcc of the PWM controller 20 and the first to third drivers 31-33 is grounded. The PWM controller 20 and the first to third drivers 31-33 cannot operate.

The first voltage must be input earlier than the second voltage in the circuit. The sequence circuit ensures that the first voltage and the second voltage work in a correct sequence.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A sequence circuit, comprising:

first to third power input terminals, first to sixth resistors, first to fourth filed effect transistors (FETs), a first capacitor, and a first driver, wherein:

the first power input terminal is grounded through the first and second resistors in that order, the first capacitor and the second resistor are connected in parallel;

a node between the first and second resistors is connected to a gate of the first FET, a source of the first FET is grounded, a drain of the first FET is connected to a gate of the second FET, the gate of the second FET is connected to the second power input terminal through the third resistor, a source of the second FET is connected to the second power input terminal, a drain of the second FET is connected to a power pin of a pulse width management (PWM) controller, the drain of the second FET is grounded through the fourth resistor, the gate of the first FET is connected to a gate of the third FET, a source of the third FET is grounded, a drain of the third FET is connected to the third power input terminal through the fifth resistor, a drain of the third FET is connected to a gate of the fourth FET, a source of the fourth FET is grounded, a drain of the fourth FET is connected to the power pin of the PWM controller through the sixth resistor, the power pin of the PWM controller is connected to a power pin of the first driver, the first FET, the third FET and the fourth FET are n-channel, the second FET is p-channel, and a voltage of high level is input to the third power input terminal constantly.

2. The sequence circuit of claim 1, further comprising a power output terminal, fifth to tenth FETs, first to third inductors, a second capacitor, a second driver, and a third driver, wherein:

the power pin of the PWM controller is connected to power pins of the second driver and the third driver, a second output pin of the PWM controller is connected to an input pin of the second driver, a third output pin of the PWM controller is connected to an input pin of the third driver, drains of the fifth FET, the seventh FET, and the ninth FET are connected to the first power input terminal;

a gate of the fifth FET is connected to a first output pin of the first driver, a source of the fifth FET is connected to a drain of the sixth FET, the source of the fifth FET is grounded through the first inductor and the second capacitor in that order, a node between the first inductor and the second capacitor is connected to the power output terminal, a gate of the sixth FET is connected to a second output pin of the first driver, a source of the sixth FET is grounded, a gate of the seventh FET is connected to a first output pin of the second driver, a source of the seventh FET is connected to a drain of the eighth FET, a source of the seventh FET is connected to the power output terminal through the second inductor, a gate of the eighth is connected to a second output pin of the second driver, a source of the eighth FET is grounded, a gate of the ninth FET is connected to a first output pin of the third driver, a source of the ninth FET is connected to a drain of the tenth FET, the source of the ninth FET is connected to the power output terminal through the third inductor, a gate of the tenth FET is connected to a second output pin of the third driver, and a source of the tenth FET is grounded, the fifth to tenth FETs are n-channel.

* * * * *